(12) United States Patent
Kim

(10) Patent No.: US 9,616,977 B2
(45) Date of Patent: Apr. 11, 2017

(54) PADDLE BOARDS AND THE MANUFACTURING METHOD OF THE SAME

(71) Applicant: AIR BOX CO., LTD., Incheon (KR)

(72) Inventor: Byung-Joo Kim, Incheon (KR)

(73) Assignee: AIR BOX CO., LTD., Incheon (KR)

( * ) Notice: Subject to any disclaimer, the term of this patent is extended or adjusted under 35 U.S.C. 154(b) by 0 days.

(21) Appl. No.: 14/896,918

(22) PCT Filed: Aug. 28, 2015

(86) PCT No.: PCT/KR2015/009028
§ 371 (c)(1),
(2) Date: Dec. 8, 2015

(87) PCT Pub. No.: WO2016/036063
PCT Pub. Date: Mar. 10, 2016

(65) Prior Publication Data
US 2016/0200405 A1    Jul. 14, 2016

(30) Foreign Application Priority Data

Sep. 4, 2014 (KR) ........................ 10-2014-0117920

(51) Int. Cl.
*B63B 35/79* (2006.01)
*B29C 65/72* (2006.01)
*B29L 31/52* (2006.01)

(52) U.S. Cl.
CPC .......... *B63B 35/7906* (2013.01); *B29C 65/72* (2013.01); *B63B 35/7913* (2013.01); *B63B 35/7926* (2013.01); *B29L 2031/5272* (2013.01)

(58) Field of Classification Search
CPC . B29C 65/72; B63B 35/7913; B63B 35/7926; B63B 7/082; B63B 7/08
See application file for complete search history.

(56) References Cited

U.S. PATENT DOCUMENTS

| | | | | |
|---|---|---|---|---|
| 7,845,999 | B2* | 12/2010 | Conner, Jr. | B32B 3/12 441/74 |
| 8,286,573 | B2* | 10/2012 | Hoge, Jr. | B63B 3/38 114/140 |
| 8,834,220 | B2* | 9/2014 | Haller | B63B 35/79 114/140 |
| 2011/0036284 | A1* | 2/2011 | Chon | B63B 3/38 114/345 |

FOREIGN PATENT DOCUMENTS

| | | |
|---|---|---|
| JP | 2009-500211 A | 1/2009 |
| JP | 2011-152833 A | 8/2011 |
| JP | 2011-225008 A | 11/2011 |
| KR | 10-2007-0120690 A | 12/2007 |
| KR | 20-2009-0009531 U | 9/2009 |
| KR | 10-2009-0128770 A | 12/2009 |
| KR | 10-2013-0088617 A | 8/2013 |
| KR | 10-1402928 B1 | 6/2014 |

* cited by examiner

*Primary Examiner* — Andrew Polay
(74) *Attorney, Agent, or Firm* — Rabin & Berdo, P.C.

(57) ABSTRACT

Disclosed herein is a paddle board and a manufacturing method thereof, and in particular a paddle board and a manufacturing method thereof wherein a board body is formed of a double space sheet to accommodate air therein, thus obtaining a light structure and an easier storage and transfer, and a wedge part is formed at a lower side of a front end of a board so as to guide the current of water, thus enhancing speed feeling when in use.

9 Claims, 6 Drawing Sheets

US 9,616,977 B2

PADDLE BOARDS AND THE MANUFACTURING METHOD OF THE SAME

TECHNICAL FIELD

The present invention relates to a paddle board and a manufacturing method thereof, and in particular to a paddle board and a manufacturing method thereof wherein a board body is formed of a double space sheet to accommodate air therein, thus obtaining a light structure and an easier storage and transfer, and a wedge part is formed at a lower side of a front end of a board so as to guide the current of water, thus enhancing speed feeling when in use.

BACKGROUND ART

In recent years, the people who are interested in health continue to increase. As life standard increases, the number of people who want to enjoy various leisure activities and leisure sports is on the rise.

Leisure sports which people can enjoy among nature, for example, mountains, rivers, sea, etc. are being developed day by day. Among such sports, a surfing sport may be exampled as one of leisure sports on water. The surfing sport may be divided into a wave riding, a wind surfing, etc.

For the sake of above surfing, a surfing board is a necessary item. The above surfing board may be used in various ways, for example, a user may stand with both feet on a board or may ride waves with his chest contacting on the board.

The surfing board in general has about 1.5~3.7 meter long, about 50~60 cm long, and about 7~10 cm thick, which means a huge volume. In the past, such a surfing board was made of a wooden material, so it was about 50 kg.

For this reason, the conventional surfing board is hard to store and transfer. When it needs to do sports with the conventional surfing board, a high level skill is required, and costs increases.

In recent years, people are also getting interested in a paddle board which needs a lower cost than the surfing board and is easy to use. The paddle board represents a board which is narrow and long and is able to float on water. It is advantageous that a person who is not good at swimming can easily use since the user can move forward on water by paddling with arms or hands in a state where the user is supported on the board to float on water.

People are also getting interested in yoga which may be done using the above mentioned paddle board, whereupon the needs for the paddle board continuously is on the rise.

As an example of the above paddle board, the Korean patent registration number 10-1402928 describes a paddling board, which as illustrated in FIGS. 1 and 2, includes a front side member 31 formed of a double space sheet the inner upper and lower sides of which are connected with a fiber thread "T"; and a rear side member 32 which is formed of a double space sheet and installed connected to the rear of the front side member 31. A triangle molding member 36 is installed in a spaced-apart space formed at the upper and lower sides corresponding to the contacting portions of the front side member 31 and the rear side member 32. However, as illustrated in FIG. 1, since a lower surface of a front side of the board is formed in a plane shape, the user cannot feel the speed feeling as desired when using the board.

In the conventional technology, since the board is formed of the front side member 31 and the rear side member 32, a molding member 36, a sheet member 37, a Velcro tape, etc. are required to connect the front side member 31 and the rear side member 32, so the whole configuration may become complicated, and it is hard to store and use the board, and the durability of the finished product is bad.

DISCLOSURE OF INVENTION

Accordingly, the present invention is made in an effort to resolve the above-mentioned problems. It is an object of the present invention to provide a paddle board and a manufacturing method thereof wherein the speed feeling can be enhanced with a simplified configuration when in use in such a way to form a wedge part which is able to guide the current of water at a lower side of a front end by injecting air into the inside of a board body.

It is another object of the present invention to provide a paddle board and a manufacturing method thereof wherein a board body is formed of a double space sheet which is able to accommodate air therein, which allows a light structure and an easier storage and transfer, and men and women of all ages can freely and conveniently use, and the durability of a finished product can be enhanced thanks to a simplified configuration.

Technical Solution

To achieve the above objects, there is provided a paddle board, which may include, but is not limited to, a body unit made of a double space sheet, wherein a wedge unit is formed protruding from a lower surface of the body unit.

Here, a cut-away part is formed at one side on an upper surface of the body unit.

The cut-away part is formed in a V-shape or a "-" shape.

In addition, a reinforcing sheet is attached to the cut-away part.

To achieve the above objects, there is provided a manufacturing method of a paddle board, which may include, but is not limited to, a body unit forming step wherein a body unit is formed in such a way to cut a double space sheet fabric wherein fiber threads are formed inside, into the shape of the body unit; and a wedge part processing step wherein when air is injected into the inside of the body unit, a V-shaped wedge part is formed protruding from a lower side of the body unit.

The wedge part processing step may include a cut-away part forming step wherein a cut-away part is formed on an upper surface of a front side of the body unit formed in the body unit forming step; a fiber thread removing step wherein the fiber threads which are present attached to the cut-away part are removed from the body unit; and a cut-away part adhering step wherein the cut-away part is pulled grabbing both sides thereof, and the both sides are contacted with each other and are adhered.

There is further provided a reinforcing sheet adhering step following the cut-away part adhering step, wherein a reinforcing sheet is adhered to an upper surface of the cut-away part the both sides of which have been adhered in contacting states.

After the reinforcing sheet adhering step, a lateral member adhering step is carried out to cover the upper sheet and the lower sheet.

Advantageous Effects

According to the present invention, it is possible to allow a good speed feeling when in use in such a way to form a wedge part which is able to guide the current of water at a lower side of a front end by injecting air into the inside of a board body.

In the present invention, a board body is formed of a double space sheet which is able to accommodate air therein, which allows a light structure and an easier storage and transfer, and men and women of all ages can freely and conveniently use, and the durability of a finished product can be enhanced thanks to a simplified configuration.

BEST MODES FOR CARRYING OUT THE INVENTION

The paddle board and manufacturing method thereof according to a preferred exemplary embodiment of the present invention will be described with reference to the accompanying drawings.

Figure 1:
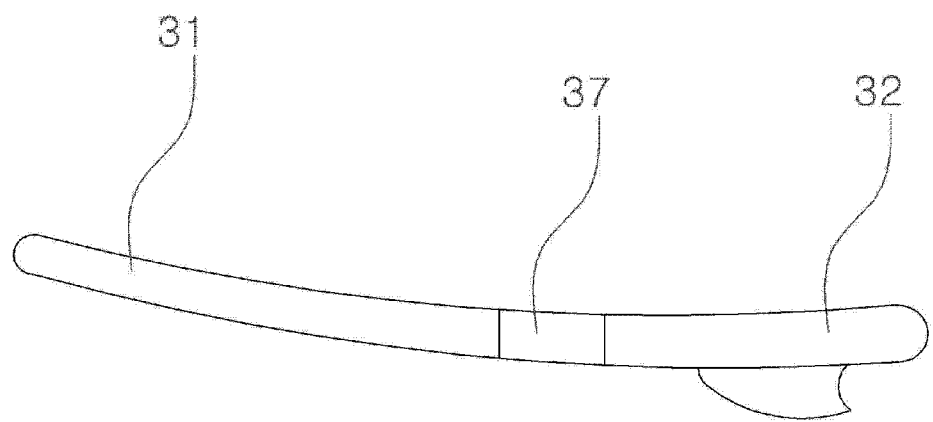
FIG. 1 is a plane view illustrating a conventional paddling board.
Figure 2:
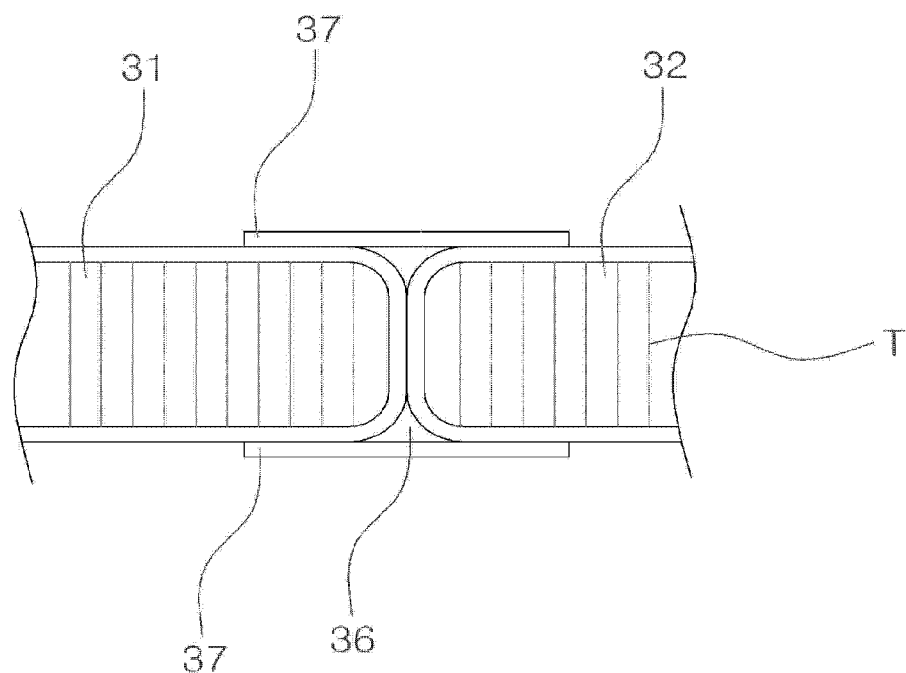
FIG. 2 is a cross sectional view illustrating a major component of a conventional paddling board in FIG. 1.
Figure 3:
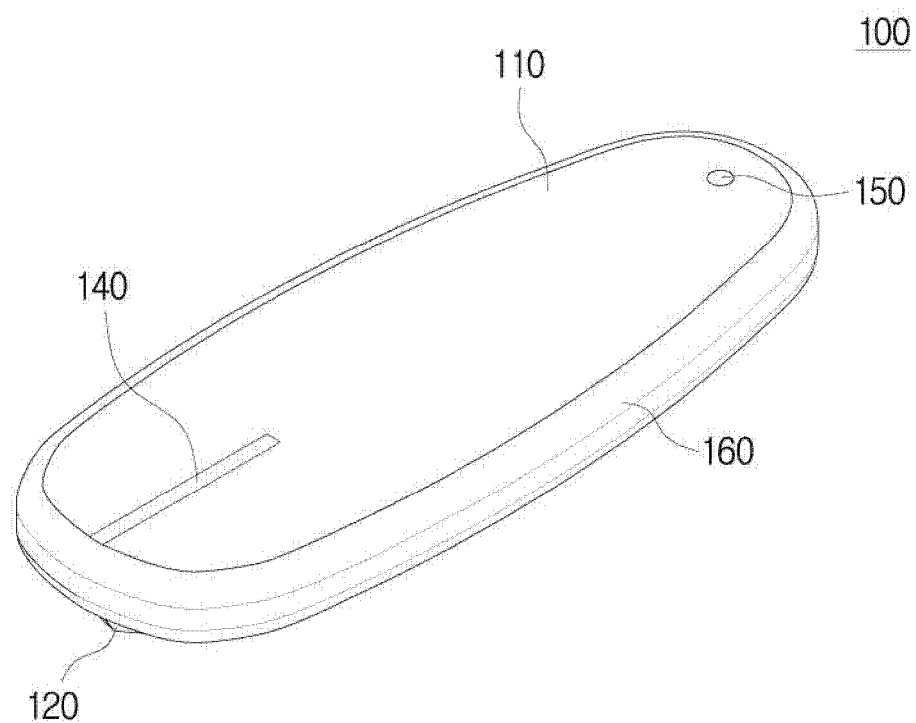
FIG. 3 is a perspective view illustrating a paddle board according to the present invention.
Figure 4:
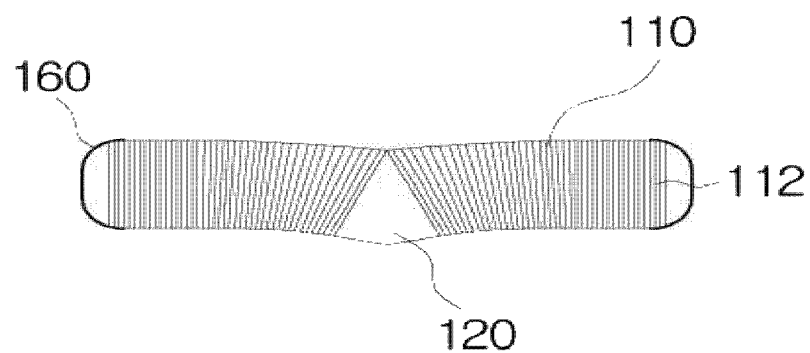
FIG. 4 is a front cross sectional view illustrating a configuration in FIG. 3.
Figure 5:
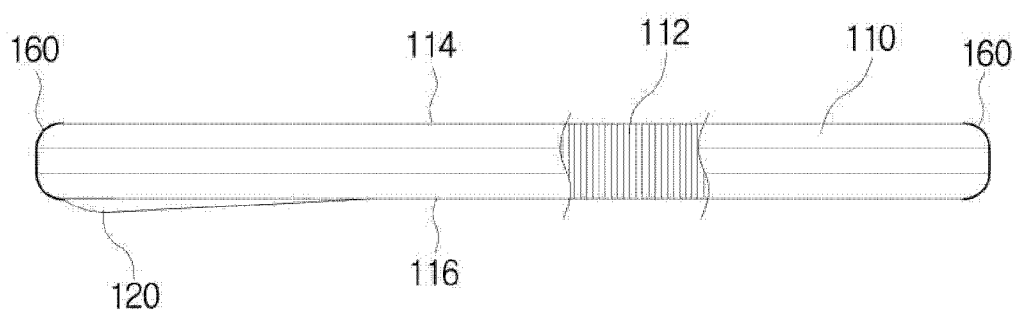
FIG. 5 is a side view illustrating a configuration in FIG. 3.

FIG. 3 is a perspective view illustrating a paddle board according to the present invention. FIG. 4 is a front cross sectional view illustrating a configuration in FIG. 3. FIG. 5 is a side view illustrating a configuration in FIG. 3.

The present invention is directed to a paddle board and a manufacturing method thereof wherein a board body is formed of a double space sheet to accommodate air therein, thus obtaining a light structure and an easier storage and transfer, and a wedge part is formed at a lower side of a front end of a board so as to guide the current of water, thus enhancing speed feeling when in use. As illustrated in FIGS. 3 to 5, the paddle board 100 according to the present invention is configured in such a way that a wedge part 120 protrudes from a lower side of a front end of a body unit 110 so as to guide the current of water when a user uses the paddle board 100 on water.

In the conventional board using an air pressure, it is impossible to transform the shape, and in case of the board formed of a double space sheet, the whole portions of the body unit is formed flat due to a fiber sheet 112 installed inside the body unit 110, so the board may receive a lot of resistance from water when in use. For this reason, a speed feeling is bad. While keeping the advantage of the body unit 110 formed of a double space sheet, namely, a lightness and an easier storage and transfer which may be obtained since the board can be folded or rolled for the sake of storage and transfer, the present invention can be configured to reduce the resistance of water and enhance the speed feeling in such a way that the wedge part 120 can allow to move forward guiding the current of water since a V-shaped wedge part 120 protrudes from a lower side of a front end of the body unit 110 by injecting air into the inside of the body unit 110.

More specifically, the present invention may be configured in such a way that like the conventional board using a double space sheet, in the paddle board 100 according to the present invention, the body unit 110 is formed in a double space sheet structure wherein a plurality of fiber threads 112 are adhered between an upper sheet 114 and a lower sheet 116 by a thermal melting method, a bonding method, etc. An air injection port 150 is formed at one side of the body unit 110 so as to inject air into the body unit 110.

Figure 6:
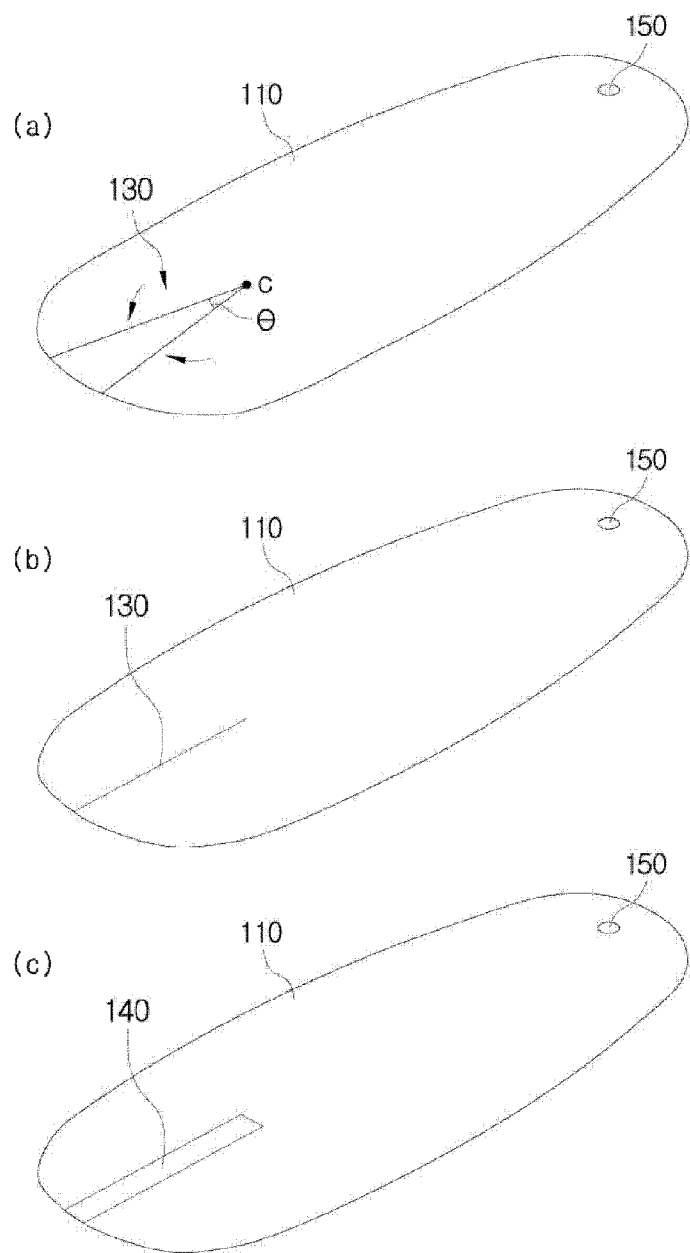
FIGS. 6A to 6C are views illustrating work procedures which are carried out to form a wedge part in FIG. 3 according to the present invention.

When air is injected into the upper surface of the front side of the body unit 110, namely, into the inside thereof, a cut-away part 130 as illustrated in FIG. 6 is formed on the upper surface of the body unit 110, namely, on the upper sheet 114, corresponding to the portion from which the wedge part 120 is protruding. The cut-away part 130 is formed in a sector shape toward the outer side of the body unit 110 from a cutting start portion "C" corresponding to the inner side of the body unit 110.

The cut-away part 130 can be formed in the above manner. After the fiber threads 112 attached to the cut-away part 130 are removed, when the cut-away part 130 is pulled grabbing both sides in order for the sheet portions to be overlapped each other about the cut-away part 130, the portion of the lower sheet 116 corresponding to the cut-away part 130 will be inflated as air is injected. Since the portion where the cut-away part 130 is formed is in a state where the fiber threads 112 have been removed, when air is injected into the inside of the body unit 110, as illustrated in FIG. 4, the wedge part 120 can be formed protruding from the lower side of the body unit 110.

It is preferred that the cutting portion of the cut-away part 130 is within ⅓ of the whole length of the body unit 110, preferably, not exceeding ½ thereof.

If the cutting portion is over ½ of the whole length of the body unit 110, the area of the cut-away part 130 may be too widened. Even though the wedge part 120 formed along the cut-away part 130 is formed too long, such a configuration does not have effect on enhancing the performance of the paddle board 100 from the provision of the wedge part 120.

The cutting angle of the cut-away part 130 is 5~20° about the cutting start portion "C", and more preferably, it is 10~20°. If the cutting angle Θ is smaller than 5° or larger than 20°, the width of the portion from which the fiber threads 112 are removed may become too narrow or too wide. In this case, such a configuration does not have effect on enhancing the performance of the paddle board 100 from the provision of the wedge part 120.

Meanwhile, a reinforcing sheet 140 is attached to the top of the cut-away part 130. The reinforcing sheet 140 may allow to form the body unit 110 by connecting the cut-away part 130 of the paddle board 100.

In a state where the cut-away part 130 is pulled grabbing both sides thereof, and the both sides thereof are contacted each other, the reinforcing sheet 140 is attached to the top of the contacted portions, thus adhering the upper surfaces of the paddle board 100, and at the same time, air is injected into the inside of the body unit 110. In this way, it is possible to maintain the strength of the portion where the cut-away part 130 is formed.

The manufacturing method of a paddle board according to a preferred exemplary embodiment of the present invention will be described with reference to the accompanying drawings.

Figure 8:
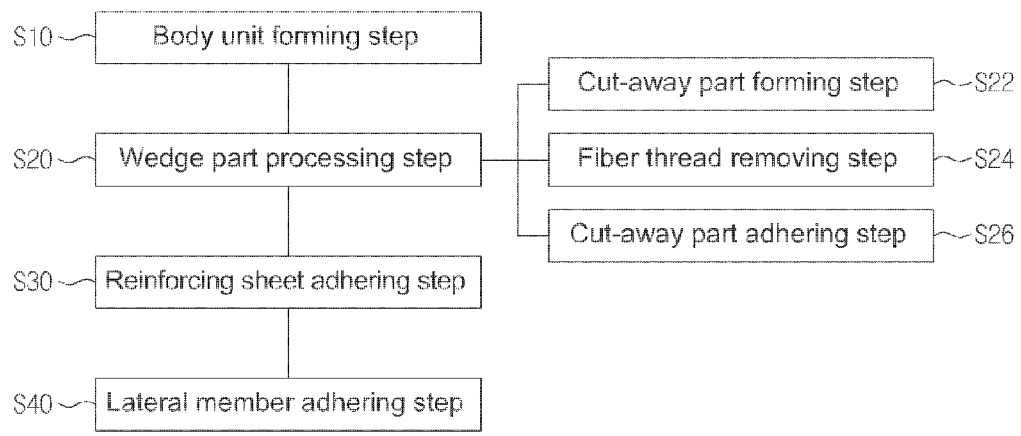
FIG. 8 is a flow chart illustrating a manufacturing method of a paddle board according to the present invention.

FIGS. 6A to 6C are views illustrating work procedures which are carried out to form a wedge part in FIG. 3 according to the present invention. FIG. 8 is a flow chart illustrating a manufacturing method of a paddle board according to the present invention.

As illustrated in FIG. 8, the manufacturing method of a paddle board according to the present invention may include, but is not limited to, a body unit forming step S10, and a wedge unit processing step S20.

In the body unit forming step S10, a double space sheet fabric within which fiber threads 112 are formed is cut into the shape of the body unit 110, thus forming the body unit 110. A double space sheet manufactured in such a way that a number of fiber threads 112 made of a material, for example, polyester, etc. are adhered between the upper sheet 114 and the lower sheet 116 by a thermal melting method, a bonding method, etc. is formed into the shape of the body unit 110.

When air is injected into the inside of the body unit 110, the fiber threads 112 are arranged positioned between the upper sheet 114 and the lower sheet 116. When air is injected into the inside of the body unit 110 with the aid of the fiber threads 112, the air can be injected, with the pressure thereof being uniformly distributed all over the portions, not concentrating at one side, and the strength of the body unit 110 can be enhanced. The paddle board 100 will not easily transform during the use of the paddle board 100.

In the wedge part processing step S20, the body unit 110 formed in the body unit forming step S10 is processed. When air is injected into the inside of the body unit 110, the V-shaped wedge part 120 will protrude from a lower surface of a front end of the body unit 110. The wedge unit processing step S20 may consist of a cut-way part forming step S22, a fiber thread removing step S24, and a cut-away part adhering step S26.

More specifically, in the cut-away part forming step S22, the cut-away part 130 is formed on an upper surface (supper sheet) of a front side of the body unit 110. The cut-away part 130 is formed in a sector shape toward the outer side of the body unit 110, namely, the front side, from the portion, set as a cutting start portion "C", within ½ of the whole length of the body unit 110 and at the virtual center line formed in the longitudinal direction of the body unit 110.

At this time, the cutting angle Θ of the cut-away part 130 may change based on the size of the body unit 110. As mentioned above, it may be formed at the angle of 5~20° about the cutting start portion "C".

Next, in the fiber thread removing step S24, the fiber threads 112 adhered to the cut-away part 130 among the fiber threads 112 formed on the double space sheet fabric are removed from the body unit 110. If the fiber threads 112 are removed in the above manner, the fiber threads 112 exist no longer on the lower surface (lower sheet) of the front side of the body unit 110 at which the wedge unit 120 is formed. To this end, if air is injected into the inside of the body unit 110, the wedge unit 120 can protrude from a portion which is not interfered with the fiber threads 112.

In the cut-away forming step S22, since the cut-away part 130 is formed in a sector shape about the cutting start portion "C", the front end of the body unit 110 from which the fiber threads 112 have been removed, may be most transformed due to the injection of air and as illustrated in FIGS. 4 and 5, so the wedge unit 120 having a V-shaped cross section can be formed.

For this reason, since the position of the cutting start portion "C" or the cutting angle Θ are be changed, the wedge unit 120 can be formed into various shapes.

In the cut-away part adhering step, an adhering may be carried out in a state where the both sides of the cut-away part 130 are pulled and are forced to contact with each other. After this step, a space in which the fiber treads 112 are not present, can be formed on the upper surface of the body unit 110, namely, on the upper sheet 114. In the event that air is injected into the inside of the body unit 110, a transformation may occur in the direction of the lower sheet 116.

The manufacturing method of a paddle board according to the present invention may include a reinforcing sheet adhering step S30 following the wedge part processing step S20. In the reinforcing sheet adhering step S30, the cut-away part 130 can be more strongly adhered in such a way to attach the reinforcing sheet 140 to the upper surface of the cut-away part 130 which has been adhered in the cut-away part adhering step S26.

Finally, a lateral member adhering step S40 will be carried following the reinforcing sheet adhering step S30. If the engagement of the cut-away part 130 is finished via the reinforcing sheet adhering step S30, a lateral member 160 will be adhered so as to cover the openings on the lateral surfaces of the upper sheet 114 and the lower sheet 116.

In this way, the paddle board 100 is manufactured. When air is injected via the air injection port 150 into the body unit 110, the paddle board 100 wherein the wedge unit 120 has been built can be manufactured.

Figure 7:
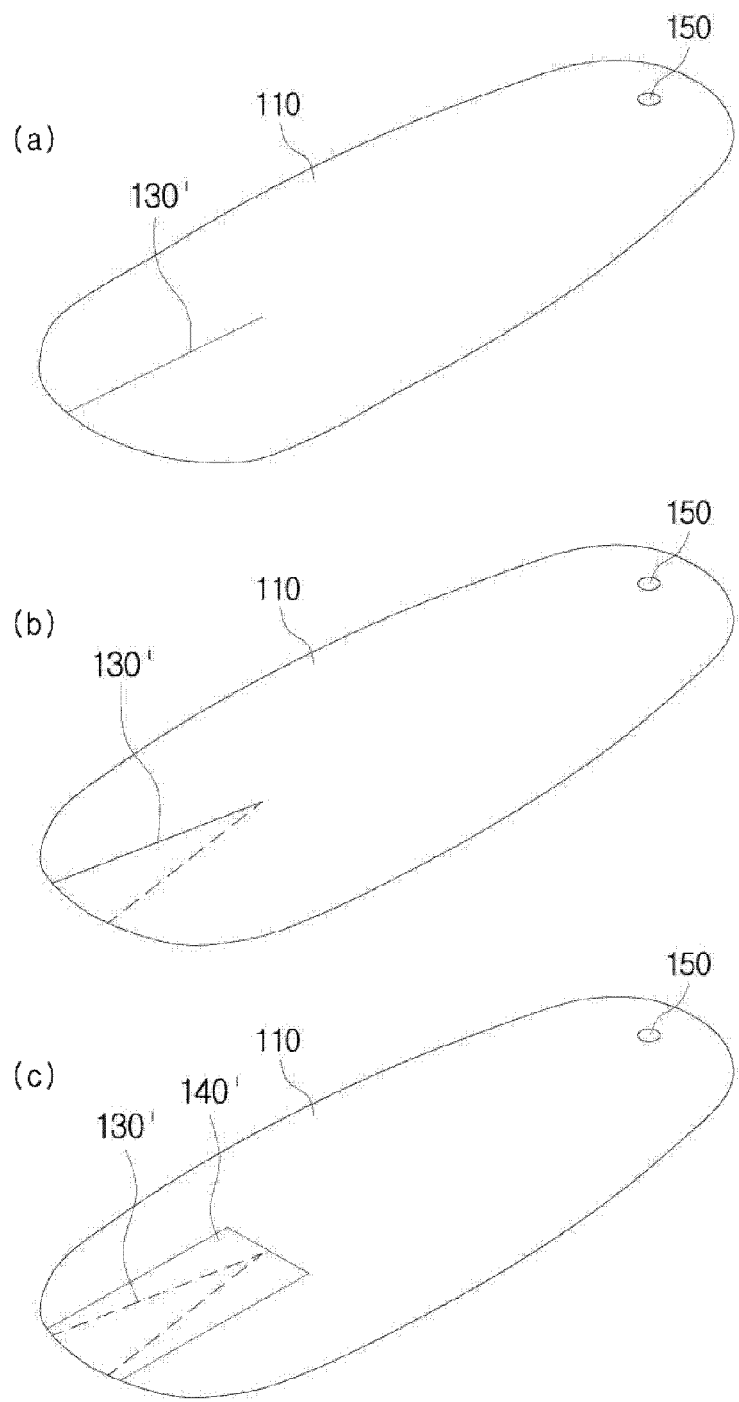
FIGS. 7A to 7C are views illustrating work procedures which are carried out to form a wedge part according to another exemplary embodiment of the present invention.

Meanwhile, according to another exemplary embodiment of the present invention to form the wedge part 120, as illustrated in FIGS. 7A to 7C, the cut-away part 130 is cut away into a "-" shape, and a cut-away part 130' is overlapped into a V-shape, and the overlapping portions are adhered.

Here, the fiber threads 112 present at the portions where the cut-away part 130' are overlapping are removed.

In addition, a reinforcing sheet 140' is adhered to cover the upper surface of the portions where the cut-away part 130' is overlapping.

In this way, the strength of the cut-away part 130' can be more enhanced. Since the residual components are same as earlier described components, the descriptions thereon will be omitted.

According to the paddle board and the manufacturing method thereof, the body of the board is made of a double space sheet, which is able to store air therein, so the finished board is light, and it is easy to transfer. Men and women of all ages can freely and conveniently use the board of the present invention. If air is injected into the inside of the board body, a V-shaped wedge unit can automatically protruded from a lower side of a front end of the board, which is able to guide the current of water. In this way, the present invention has many advantages, for example, it is possible to enhance the speed feeling of the board since the resistance of water can be reduced when in use, and durability may be enhanced thanks to simplified configuration.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

INDUSTRIAL APPLICABILITY

The present invention relates to a paddle board and a manufacturing method thereof, and in particular to a paddle board and a manufacturing method thereof wherein a board body is formed of a double space sheet to accommodate air therein, thus obtaining a light structure and an easier storage and transfer, and a wedge part is formed at a lower side of a front end of a board so as to guide the current of water, thus enhancing speed feeling when in use.

What is claimed is:

1. A paddle board, comprising:
    a body unit made of a double space sheet, wherein the double space sheet includes
        an upper sheet forming an upper surface of the body unit,
        a lower sheet forming a lower surface of the body unit, and
        fiber threads attached to both of the upper sheet and the lower sheet therebetween;
    a wedge unit disposed in a front side of the body unit and formed by the upper sheet, the lower sheet and the fiber threads, wherein the wedge unit has a triangular-shaped cross section formed by the lower sheet and innermost two fiber threads, and when air is injected into an inside of the body unit, the lower sheet protrudes outwardly such that the lower sheet forms a V-shape; and
    a reinforcing sheet attached on the upper surface of the body unit such that the reinforcing sheet covers and reinforces the wedge unit.

2. A manufacturing method of a paddle board, comprising:
    a body unit forming step wherein a body unit is formed in such a way to cut a double space sheet fabric wherein fiber threads are formed inside, into the shape of the body unit; and
    a wedge part processing step (S20) wherein when air is injected into the inside of the body unit a V-shaped wedge part is formed such that the V-shaped wedge part protrudes from a lower side of the body unit,
    wherein the wedge part processing step (S20) comprises
        a cut-away part forming step wherein a cut-away part is formed on an upper surface of a front side of the body unit formed in the body unit forming step,
        a fiber thread removing step wherein the fiber threads which are attached to the cut-away part are removed from the body unit, and
        a cut-away part adhering step wherein both sides of the cut-away part are pulled, and the both sides are contacted with each other and are adhered.

3. The method of claim 2, further comprising a reinforcing sheet adhering step (S30) following the cut-away part adhering step (S26), wherein a reinforcing sheet (140) is adhered to an upper surface of the cut-away part (130) of which the both sides have been adhered in contacting states.

4. The method of claim 3, wherein after the reinforcing sheet adhering step (S30), a lateral member adhering step (S40) is carried out to cover the upper sheet (114) and the lower sheet (116).

5. A manufacturing method of a paddle board, comprising:
    forming a body unit with a double space sheet fabric, wherein the double space sheet fabric includes
        an upper sheet forming an upper surface of the body unit,
        a lower sheet forming a lower surface of the body unit, and
        fiber threads attached to both of the upper sheet and the lower sheet therebetween;
    cutting a part of the upper sheet to form a cut-away part in a front side of the body unit;
    removing fiber threads from the double space sheet fabric such that a sector-shaped space is formed between the upper sheet and the lower sheet;
    adhering both sides of the cut-away part such that the both sides are adhered with each other;
    forming a wedge part by injecting air into the inside of the body unit such that a the lower sheet corresponding to the cut-away part protrudes outwardly and forms a V-shape.

6. The method of claim 5, wherein the cut-away part has a "-" shape, and the both sides of the cut-away part are adhered such that a portion of the both sides are overlapped.

7. The method of claim 5, wherein the cut-away part has a sector shape, and the both sides of the cut-away part are adhered such that edges of both sides are contacted with each other.

8. The method of claim 5, further comprising
    adhering a reinforcing sheet to the upper surface of the body unit such that the reinforcing sheet covers the cut-away part.

9. The method of claim 8, further comprising
    adhering a lateral member to cover the upper sheet and the lower sheet.

* * * * *